3,252,974
SULFANILAMIDO TRIAZINES AND METHOD OF PREPARING THE SAME

Helen M. Krazinski, Ramsey, and Robert G. Shepherd, Ridgewood, N.J., and William E. Taft, New City, N.Y., assignors to American Cyanamid Company, New York, N.Y., a corporation of Maine
No Drawing. Filed Mar. 26, 1959, Ser. No. 802,003
3 Claims. (Cl. 260—239.65)

This invention relates to new sulfonamides. More particularly, it relates to sulfa-s-triazines and their method of preparation.

The use of sulfadiazine as an antibacterial agent is well known for many years. Other sulfa drugs such as sulfamethoxypyridazine have more recently come into prominence for special uses because of their ability to produce high blood levels for longer periods of time. Since the bacterial spectrums of sulfa drugs are not identical, others that produce high blood levels are desirable.

We have now found that sulfa-s-triazines having the following general formula are active and produce comparatively high blood levels.

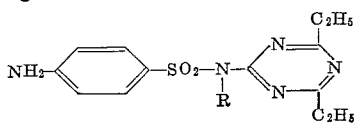

in which R is a member of the group consisting of hydrogen, and alkali metals.

The compounds of the present invention are crystalline solids with varying solubility in water, except the alkali metal salts which are all highly soluble in water.

The alkali metal salts of the present compounds are prepared by reacting an alkali metal sulfanilamide with a 2,4-diethyl-6-lower alkoxy-s-triazine in absolute alcohol. The reaction is preferably carried out at the refluxing temperature of the solvent. The sulfonamides can be obtained by acidification of the alkali metal salts.

While it is possible to prepare analogs of sulfa-4,6-diethyl-s-triazine such as for example sulfa-4-methyl-6-ethyl-s-triazine, sulfa-4-methyl-6-propyl-s-triazine or sulfa-4-propyl-6-ethyl-s-triazine they are not commercially attractive since they are difficult to synthesize.

The compounds of the present invention are antibacterial agents effective against various bacterial infections, for example, streptococcal and staphlococcal infections. The latter are a continuing therapeutic problem and in many cases are resistant to antibiotics. Sulfa-diethyl-s-triazine is more active than sulfa-isoxazole and maintains a good blood level. The solubility of sulfa-diethyl-s-triazine is adequate to avoid crystallauria and the solubility of the usual sulfa drug metabolite, the $N^4$-acetyl derivative, is even higher than that of the "free sulfonamide." The latter property is not generally present in sulfa drugs such as for example sulfa-isoxadole. sulfa-diethyl-s-triazine is five times as active as sulfa-dimethyl-s-triazine and several times more active than sulfa-dipropyl-s-triazine. Furthermore, the sulfa-diethyl-s-triazine maintains its blood concentration much more effectively than sulfa-dimethyl-s-triazine. For example, it requires five times as long for the blood concentration of sulfa-diethyl-s-triazine to decrease to one-half its value as for the sulfa-dimethyl-s-triazine blood level to undergo the same decrease. It is well established that the maintenance of blood levels is essential for effective therapy with sulfa drugs.

The following examples describe in detail the preparation of sulfa-diethyl-s-triazines of the present invention. Parts are by weight unless otherwise indicated.

EXAMPLE I

*Preparation of sodium salt of 2-sulfanilamido-4,6-diethyl-s-triazine*

One hundred and eighty-seven and one-half parts of ethyl propionimidate are refluxed with 68.3 parts of methylisourea hydrochloride for 1.5 hours. The two layers which formed on refluxing are separated and the upper layer is vacuum distilled. The product which distills at 59°–66° C. at 0.75 mm. is a clear, colorless liquid having a refractive index of 1.4765 at 20° C. The other products of the reaction are propionamidine hydrochloride, a white crystalline solid melting at 141.0–142.0° C., and ethanol.

A solution of sodium sulfanilamide is prepared by adding 43 parts of sulfanilamide to a solution of 5.75 parts of metallic sodium in 200 parts of absolute methanol. To this solution there is added 42 parts of 2,4-diethyl-6-methoxy-s-triazine prepared immediately above and the resulting solution is refluxed gently with exclusion of moisture for 70 hours. Cooling of the reaction mixture yielded a copious white solid which is filtered, washed and dried. Concentration of the filtrate, followed by cooling, yields additional material. Analysis of the product together with its chemical properties demonstrates it to be the sodium salt of 2-sulfanilamido-4,6-diethyl-s-triazine.

EXAMPLE II

*Preparation of 2-sulfanilamido-4,6-diethyl-s-triazine*

A total of 55 parts of the sodium salt of 2-sulfanilamido-4,6-diethyl-s-triazine is dissolved in 175 parts of water. To this solution is added (dropwise with stirring) about 27 parts of 6 N hydrochloric acid (final pH 3–3.5). The resulting granular white precipitate is filtered, washed and dried. This material can be dissolved in boiling ethanol, treated with activated charcoal, filtered and cooled. The resulting white crystals melted at 190.0–190.5° C. This substance can be isolated directly from the reaction mixture by partial evaporation, addition of water and finally acidification as above.

We claim:
1. Compound having the general formula

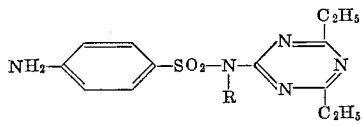

in which R is a member of the group consisting of hydrogen, and alkali metals.
2. The compound 2-sulfanilamido-4,6-diethyl-s-triazine.
3. The sodium salt of 2-sulfanilamido-4,6-diethyl-s-triazine.

(References on following page)

References Cited by the Examiner

UNITED STATES PATENTS

| | | | |
|---|---|---|---|
| 2,510,503 | 6/1950 | Kropa | 260—248 |
| 2,774,756 | 12/1956 | Klotzer | 260—239.7 |

FOREIGN PATENTS

| | | |
|---|---|---|
| 183,758 | 11/1955 | Austria. |
| 199,193 | 8/1958 | Austria. |
| 244,348 | 4/1947 | Switzerland. |

OTHER REFERENCES

Northey: "Sulfonamides and Allied Compounds," Reinhold Publ. Corp., New York, pp. 88–90 (1948).

WALTER A. MODANCE, *Primary Examiner.*

IRVING MARCUS, H. J. LIDOFF, *Examiners.*

F. A. KEIRE, E. E. BERG, JOHN D. RANDOLPH,
*Assistant Examiners.*